Figure 1:
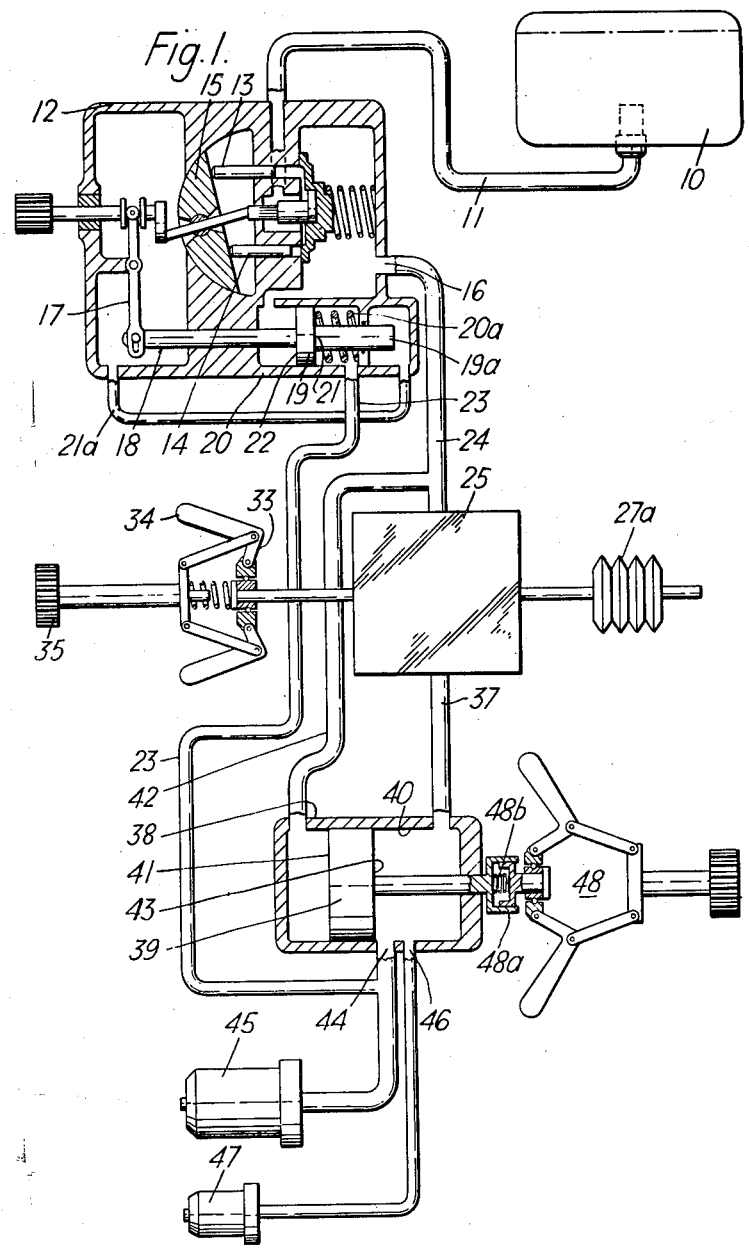

April 16, 1963 A. JUBB ET AL 3,085,397
GAS TURBINE ENGINE FUEL SYSTEM
Filed July 22, 1958 6 Sheets-Sheet 1

Inventors
Albert Jubb
Christopher Linley Johnson
By
Leech & Radue Attorneys

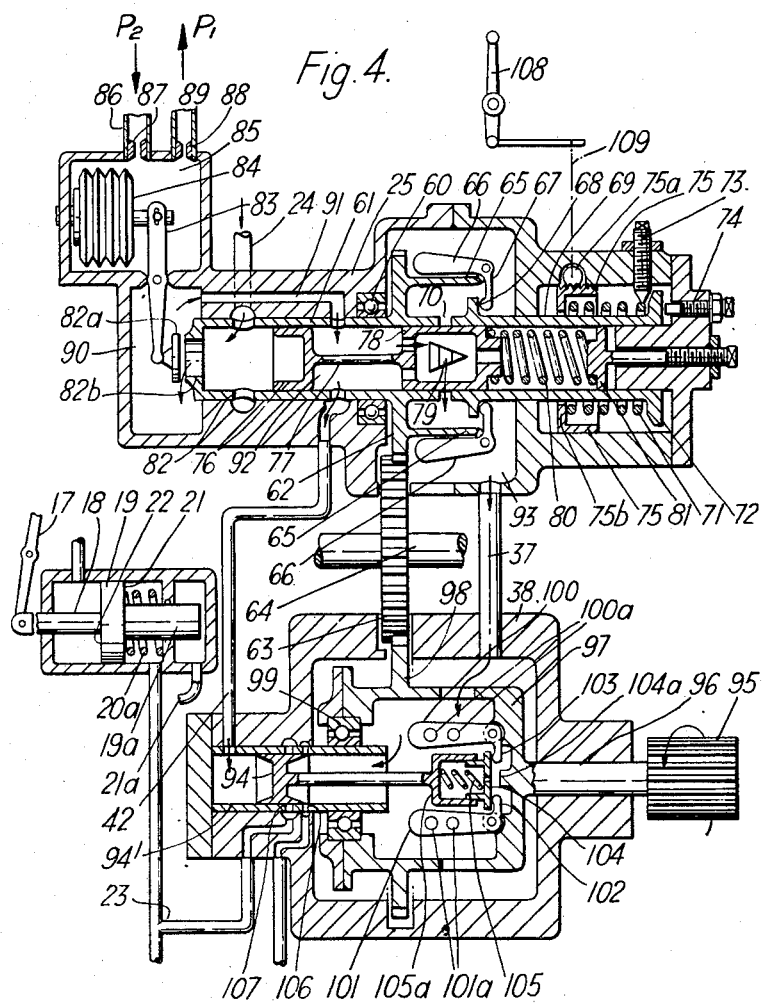

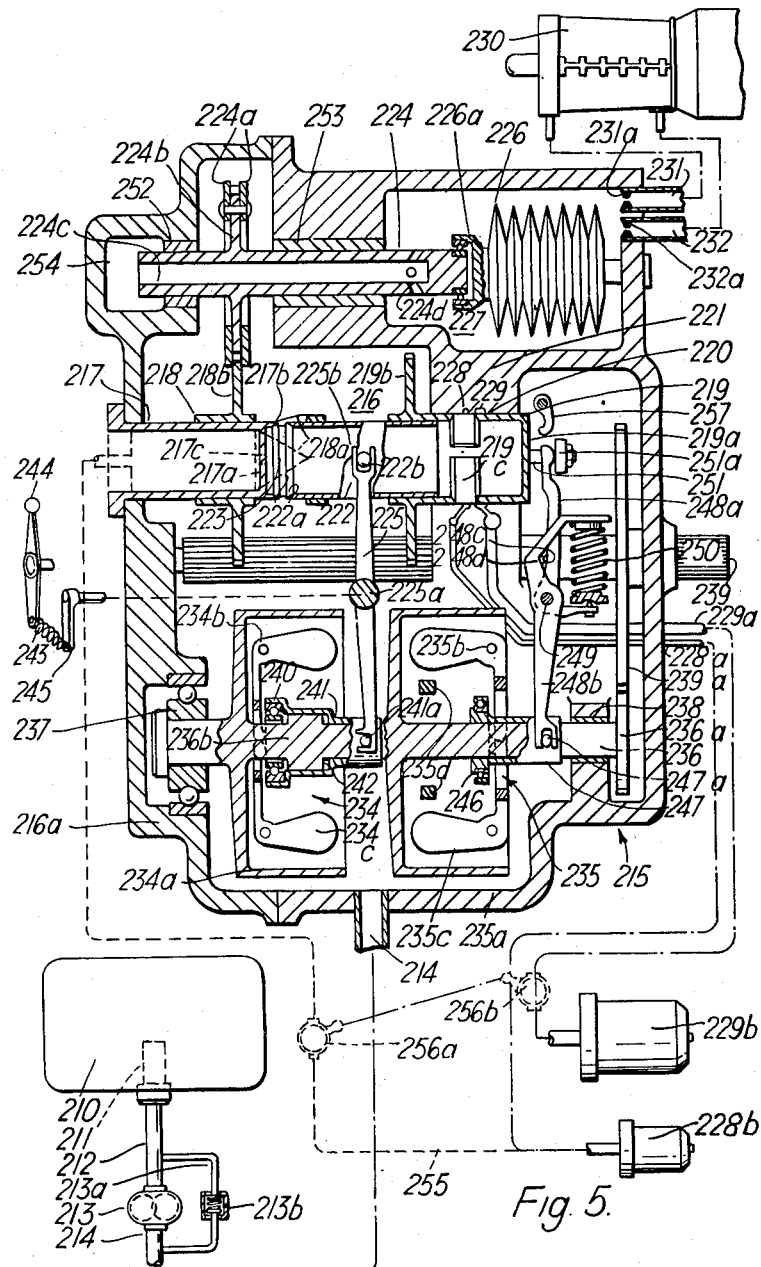

April 16, 1963 A. JUBB ET AL 3,085,397
GAS TURBINE ENGINE FUEL SYSTEM

Filed July 22, 1958 6 Sheets-Sheet 6

Inventors
Albert Jubb
Christopher Linley Johnson
By
Leech + Radue Attorneys

_United States Patent Office_   3,085,397
Patented Apr. 16, 1963

3,085,397
GAS TURBINE ENGINE FUEL SYSTEM
Albert Jubb, Derby, and Christopher Linley Johnson, Allestree, Derby, England, assignors to Rolls-Royce Limited, Derby, England, a company of Great Britain
Filed July 22, 1958, Ser. No. 750,177
Claims priority, application Great Britain Aug. 1, 1957
9 Claims. (Cl. 60—39.28)

This invention relates to a gas turbine engine fuel system in which fuel flow is metered through an orifice in accordance with a controlled pressure drop across the orifice.

An object of the invention is to provide a simple hydraulic arrangement which will give reasonably accurate control of acceleration and deceleration and will operate satisfactorily throughout a range of atmospheric pressures.

According to the present invention there is provided a gas turbine engine fuel system for controlling the supply of pressurized fuel from a source thereof to a burner of a gas turbine engine comprising a fuel supply control unit, means in said control unit providing an orifice, means for supplying pressurized fuel from said source to said burner via said control unit and orifice, means for varying the size of the orifice in accordance with engine rotational speed and, independently, in direct proportion to the ratio of the outlet pressure $P_2$ and the intake pressure $P_1$ of a compressor of the engine, and means for metering the fuel flow to the burner in accordance with the pressure drop across the orifice.

Preferably the full flow of fuel from the source to the burner passes through the orifice. This arrangement obviates the use of servo valves which tend to stick and require filtering of the fuel.

The orifice may be in the form of a slot, the width of which is controlled by means responsive to engine rotational speed, in combination with a movable plate, or a movable aperture, which is adapted to provide an increase or decrease in the area of the orifice directly proportional to the movement imparted to the plate or aperture by means movable in response to a function of the compressor ratio $P_2/P_1$.

Preferably, however, the orifice is constituted by apertures in a pair of relatively movable concentric cylindrical members one of which is mounted closely within the other, the means for varying the size of the orifice effecting relative movement of the cylindrical members so as to vary the relative positions of the apertures therein.

In order to diminish the risk of sticking between the said concentric cylindrical members it is desirable to arrange that these members are relatively rotatable and relatively slidable axially, the means for varying the size of the orifice effecting relative axial movement of these members, and means being provided for effecting relative rotation of these members.

Preferably one of said cylindrical members is in two axially spaced parts which are relatively movable axially so as to vary the size of the aperture between said parts, at least one of said axially spaced parts being relatively rotatable with respect to the other cylindrical member. The other of said cylindrical members may be axially movable and provided with at least one circumferential aperture of varying cross-section axially e.g. of triangular cross-section.

The relative movement of the cylindrical members may be controlled by pressure responsive means, opposite faces of said pressure responsive means being adapted to be supplied with air at the pressures $P_1$, $P_2$, or at pressures functionally related thereto.

Preferably the means for metering the fuel flow to the burner in accordance with the pressure drop across the orifice comprises a valve member axially movable in a valve body, the valve member controlling fuel flow from the orifice to the burner, opposite sides of the valve member being subjected to the pressures on opposite sides respectively of the orifice, the valve member also being axially positionable in dependence upon engine rotational speed. Desirably, means are provided for effecting relative rotation between the valve member and the valve body.

The pressurized fuel can be supplied by any fuel pump such as a centrifugal pump, a variable capacity pump, or a fixed capacity pump with an excess flow by-pass or relief valve. If a variable capacity pump is used, and it is not desired to by-pass excess fuel, the pump capacity can be varied in accordance with the pressure of fuel flowing to the burner by applying the latter pressure to a resiliently-loaded pressure-sensitive device adapted to actuate a pump capacity changing mechanism.

If desired, the flow to a pilot burner, if used, can be taken directly from the downstream side of the orifice so that only the main fuel supply passes through the valve body mentioned above. The flow to the pilot burner can be maintained at all times, thus avoiding the use of a "pressurizing" valve.

Figure 2:
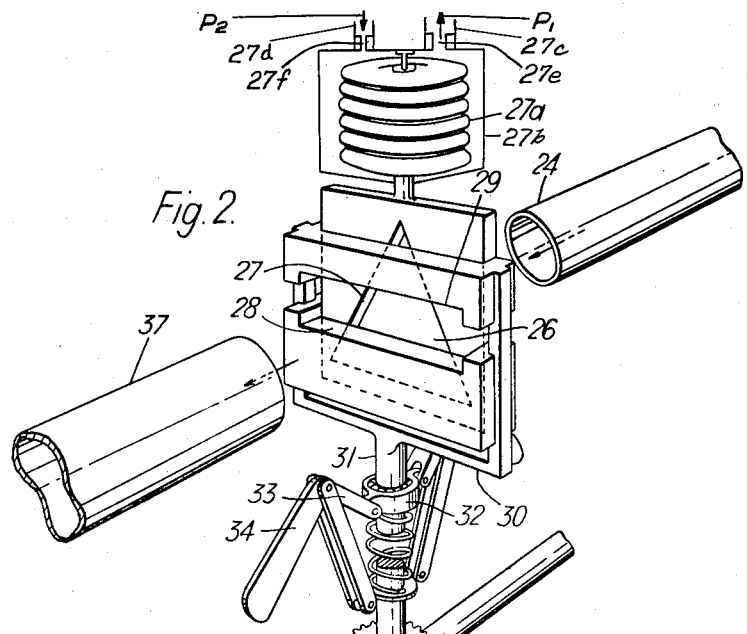
Figure 3:
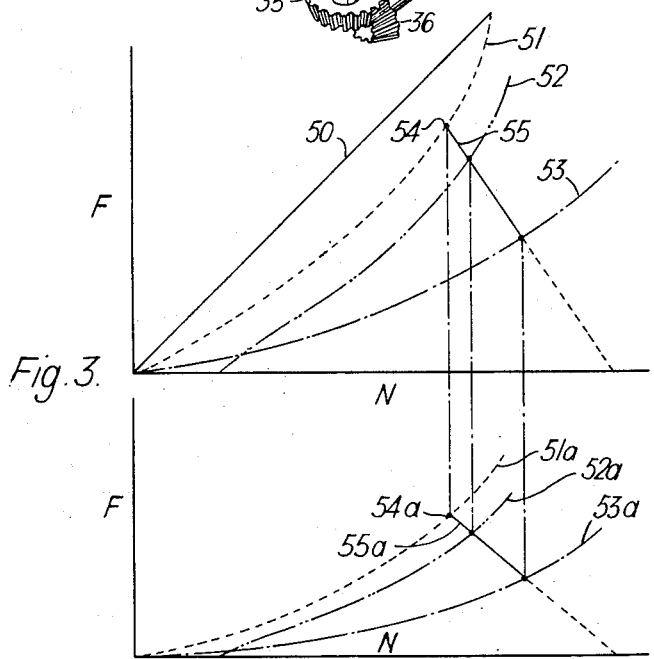
Figure 3A:
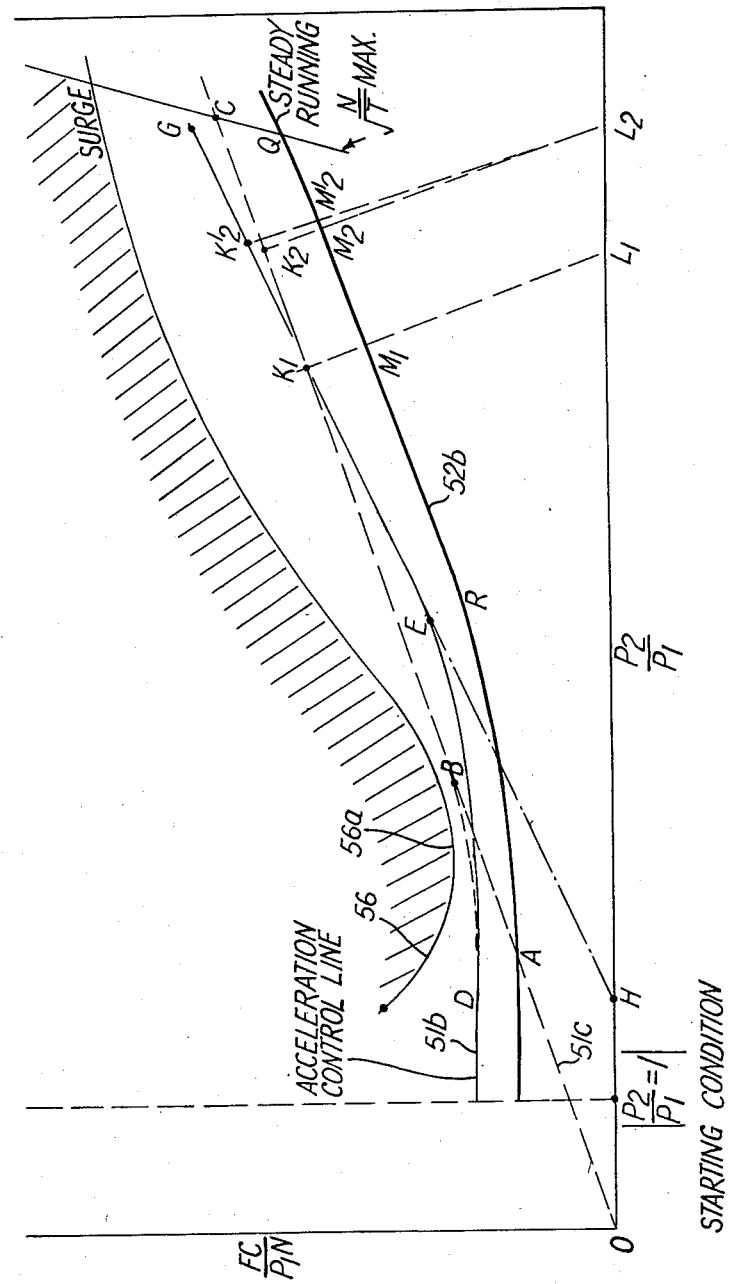
Figure 6:
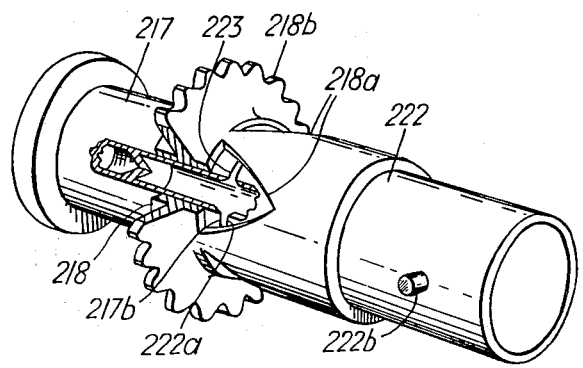

The invention is illustrated, merely by way of example, in the accompanying drawings in which:

FIGURE 1 shows diagrammatically a fuel system embodying the invention,

FIGURE 2 shows diagrammatically some details of the central block shown in FIGURE 1, FIGURES 3 and 3a are graphical representations of the working of the fuel system according to the invention, FIGURE 4 is a diagrammatic representation of another embodiment of the invention, FIGURE 5 is a diagrammatic representation of yet another embodiment of the invention, and FIGURE 6 is a perspective view of a detail of FIGURE 5.

In FIGURE 1 is shown a fuel tank 10 connected by a pipe 11 to a variable capacity engine-driven pump 12. The pump 12 is conventional and includes pistons 13 and 14 operable by a rotated swash plate 15 to deliver fuel at the outlet 16 of the pump. The angle of the swash plate 15 is variable to vary the capacity of the pump. Variation is effected by means of a lever 17 movable by a piston rod 18 carrying a piston 19 contained in a cylinder 20. One side 21 of the piston 19 is acted upon by a coil spring 20a and may as shown, be of less effective area than the other side 22 of the piston 19.

The side 22 of the piston 19 is acted upon by the output fuel pressure of the pump, and the side 21 of the piston 19 is acted upon by fuel pressure transmitted through pipe 23. The pipe 21a is included to convey the fuel pressure acting on rod 18 to the end face of the rod 19a so that this pressure does not substantially affect the piston 19. The outlet of the pump 16 is connected by pipe 24 to a first control unit 25. The first control unit 25 contains the orifice the pressure drop across which controls the metering of the fuel. The orifice is shown more clearly in FIGURE 2, and comprises a variable width rectangular slot 26 and a triangular slot 27. The variable width rectangular slot 26 has a fixed edge 28 and a movable edge 29. The edge 29 is movable by a frame 30 attached to a shaft 31 which is rotatably supported in a collar 32, but is axially fast with the collar 32. The collar 32 is movable by arms 33 of a governor having movable weights 34. The governor is driven through gears 35, 36 from the gas turbine engine, and is arranged to move the movable edge 29 of the slot 26 when a predetermined engine speed is obtained so as to decrease the width of the slot. Stops (not shown) are also provided to define the maximum and minimum widths of the slot.

The triangular slot 27 is movable by a bellows 27a which is mounted in a chamber 27b. The chamber 27b communicates via conduits 27c, 27d with the inlet and outlet sides of the engine compressor. Thus the conduits 27c, 27d, which contain restrictions 27e, 27f respectively, are open to the compressor inlet pressure $P_1$ and the compressor outlet pressure $P_2$ respectively.

Flow, at a temperature $T_1°$ K., through a retstriction on opposite sides of which the pressures $P_2$, $P_1$ prevail, may however be shown to be given by:

$$Q = \frac{M\sqrt{T_1}}{AP_2} = f\left(\frac{P_2}{P_1}\right)$$

where $A$=the area of the restriction and $M$=the mass flow (see Jamison and Mordell, Ministry of Aircraft Production, R. & M. No. 2031, 1950).

When, however, the velocity through the restriction becomes sonic, the downstream pressure can no longer influence the flow and Q becomes constant and the orifice is said to be "choked."

Suppose now that the areas of the restrictions 27f, 27e are $A_1$, $A_2$ respectively and suppose that there is no loss or gain of heat from the system so that the gas temperature is the same at each of the restrictions 27f, 27e and that the mass flow is the same through each of them. Then $$\frac{M\sqrt{T_1}}{A_1P_2} = \frac{M\sqrt{T_1}}{A_2X_1}$$

where $X$=pressure within the chamber 27b.

$$\therefore \frac{P_2}{X} = \frac{A_2}{X}$$

$$\therefore X = \frac{A_2}{A_2} \cdot P_2$$

$$= P_1 \frac{A_1}{A_2}\left(\frac{P_2}{P_1}\right)$$

$$= P_1 F\left(\frac{P_2}{P_1}\right)$$

where F is a function whose value depends upon the value of the areas of the restrictions 27e, 27f.

Thus the size of the orifice determined by the combination of the rectangular slot and the triangular slot is controlled in response to engine rotational speed and in response to $$P_1 F\left(\frac{P_2}{P_1}\right)$$

The outlet of the control unit 25 (FIGURE 1) is through pipe 37 to a second control unit 38 comprising a piston 39 contained in a cylinder 40. The pump outlet fuel pressure (i.e. the fuel pressure upstream of the orifice) is applied to one side 41 of piston 39 through a pipe 42 and the fuel pressure downstream of the orifice is applied to the other side 43 of piston 39 through pipe 37.

The position of the piston 39 is controlled partly by the pressure drop across the orifice (comprising the longitudinal slot and the triangular slot in combination). The piston 39 acts as a throttle controlling an orifice 44 leading to a main burner 45 and also an orifice 46 leading to a pilot burner 47. The load on piston 39 is also controlled in accordance with the square of engine rotational speed by a governor 48 acting through either a cap 48a or a coil spring 48b.

The throttled fuel which passes through to main burner 45 is also taken through pipe 23 to the side 21 of piston 19.

The first control unit 25 ensures that the area of the orifice is variable in accordance with engine rotational speed and is also variable independently in direct proportion to $$P_1 F\left(\frac{P_2}{P_1}\right)$$

and the second control unit 38 establishes the pressure drop across the orifice in accordance with a square of engine rotational speed and also acts to throttle the fuel supply to the burners.

The piston 19 is employed to control the output of the pump 12 in accordance with metered and throttled fuel pressure.

In FIGURE 3, in the upper graph, the ordinate represents engine fuel consumption FC, and the abcissa represents engine rotational speed N. The firm line 50 shows the relationship of these two quantities if no control is exercised, i.e. the pump 12 is kept in full stroke. The dotted line 51 represents the relationship when acceleration is controlled in accordance with the invention. The chain-dotted line 52 represents the engine demand at steady speed and the chain-dotted line 53 represents conditions when deceleration is controlled in accordance with the invention.

When the acceleration is controlled in accordance with the invention a point 54 will be reached at which it is arranged that the governor 34 will be brought into operation and the fuel flow will then drop along line 55 as the movable edge of the slot moves from its maximum stop towards its minimum stop.

In FIGURE 3 the lower graph represents similar conditions for the same range of speeds at a lower $P_1$, similar lines on the graph bearing the same reference numerals as in the upper graph, except for the addition of the suffix a.

It will be seen that the point 54a and other points on the line 55a are vertically below the corresponding points in the upper graph, i.e. speed of the engine at which the governor 34 will be brought into operation will be the same at the lower $P_1$ and will not increase as is frequently the case with existing systems.

In FIGURE 3a, the ordinate of the graph represents $FC/P_1N$, while the abscissa represents the engine compressor ratio $P_2/P_1$. The line 56 is the compressor surge line; that is to say, the shaded area whose limit is defined by the line 56 is the area in which surging of the compressor occurs. It will be noted that the surge line 56 has a dip 56a in it at moderate pressure ratios.

The heavy line 52b is the "steady running" line; that is to say the line 52b, like the lines 52 and 52a, represents the fuel consumption at steady engine speeds.

The full line 51b like the lines 51, 51a, is the preferred acceleration line; that is to say the line 51b represents the preferred relationship when acceleration is controlled in accordance with the invention. It is of course essential to ensure that the acceleration control line 51b is disposed between and does not cut the lines 56, 52b. If the acceleration control line 51b cuts the line 56, surging of the compressor will occur, whilst if the acceleration control line 51b cuts the line 52b, insufficient fuel will be provided at some stage to keep the engine running at steady speed.

As stated above, in the fuel system of the present invention the fuel is metered to the engine in response both to engine rotational speed and to $$P_1 F\left(\frac{P_2}{P_1}\right)$$

The simplest possible form of the function $$P_1 F\left(\frac{P_2}{P_1}\right)$$

could be obtained by evacuating the bellows 27a and applying the pressure $P_2$ to the outside of it, the bellows 27a having a displacement proportional to the total force acting on it. This would, however, produce an acceleration control line 51c in the form of a straight line passing through the origin, and if this straight line were arranged to miss the dip 56a in the surge line 56 it would cut the steady running line 52b at A. This would mean that a very powerful starter motor would be needed to speed the engine up past the point A.

Alternatively the arrangement could be such that the bellows 27a did not completely close the metering orifice even at zero pressure. This, however, would result in an excessive fuel supply when the aircraft was flying at a high altitude.

It is therefore important that the part of the acceleration control line 51b corresponding to low compressor ratios should be curved so as to lie between the surge line 56 and steady running line 52b. This is effected in practice by reason of the fact that the chamber 27b, within which the evacuated bellows 27a is mounted, is connected to sources of $P_1$ and $P_2$ by way of the restrictions 27e, 27f respectively.

When the air flow through the restriction 27e reaches the velocity of sound it is said to "choke" and the value of the pressure $P_1$ downstream of it cannot influence the mass flow therethrough or the pressure upstream of it. Thus once the restriction 27e "chokes," the pressure in the chamber 27b will be a constant fraction of $P_2$ no matter whether the restriction 27f is "choked" or not. Thus once "choking" occurs, the portion BC of the acceleration control line 51c will be obtained.

At low compressor ratios $P_2/P_1$, however, the restriction 27e will be "unchoked" and the flow through it will be less than under "choking" conditions. The pressure drop across the restriction 27f will therefore be reduced and the pressure in the chamber 27b will be nearer to $P_2$. In the limit at starting conditions, $P_2=P_1=$the pressure in the chamber 27b, since there will be no pressure drop and no flow. At starting conditions, the pressure $P_2$ will therefore be applied to the bellows 27a. This, therefore, will produce a curved acceleration line DB which merges into the straight line BC.

It will be noted that the line BC tends to approach the steady running line 52b at high pressure ratios. This tends to result in slow accelerations at high pressure ratios and also leads to a variation in governed speed with varying ambient temperature for any given setting of the spring of the governor 33, 34.

As regards the said variation in governed speed, this occurs because, if the engine inlet temperature $T_1$ varies, a given value of speed will be a variable value of $N/\sqrt{T}$ (and therefore of $P_2/P_1$ since there is a functional relationship between $N/\sqrt{T}$ and $P_2/P_1$). Suppose, for example, that at a given setting of the spring of the governor 33, 34 and at a high $T_1$, the governor 33, 34 starts to reduce the size of the slot 26 at a point $K_1$ on the line BC. The fuel flow will, say, be reduced along a line $K_1L_1$ as the speed increases, the line $K_1L_1$ intersecting the steady running line 52b at $M_1$, whereby the controlled engine speed (corresponding to $M_1$) will be a calculable amount above the speed corresponding to $K_1$.

At a lower value of $T_1$, however, the governor 33, 34 will start to reduce the size of the slot 26 at the same speed N and therefore at a higher value of $N/\sqrt{T}$ and of $P_2/P_1$. Accordingly the governor 33, 34 will start to reduce the size of the slot 26 at, say, a point $K_2$ on the line BC, the fuel flow being reduced along a line $K_2L_2$ which intersects the line 52b at $M_2$.

As will be seen from FIGURE 3a, the reduction of fuel flow between $K_2$ and $M_2$ is a smaller fraction of the initial fuel flow than the reduction of fuel flow between $K_1$ and $M_1$. The slot 26 will not therefore have to close so far to reduce fuel flow from $K_2$ to steady running conditions at $M_2$ as it will have to close to reduce fuel flow from $K_1$ to steady running conditions at $M_1$. Moreover, although the point $M_2$ represents a higher speed than the point $K_2$, the speed differential between these points is smaller than between the points $K_1$ and $M_1$. In other words, as $T_1$ falls, there is a corresponding reduction in the increase of engine speed which occurs from the point where the governor 33, 34 starts to reduce the size of the slot 26 to the point where steady running conditions are reached. Accordingly the speed to which the engine is controlled will fall with $T_1$.

A preferred feature of the present invention is therefore to provide means which ensure that the controlled speed does not substantially vary with $T_1$. This is effected by causing the fuel supply to be controlled as indicated by the preferred acceleration line 51b, the line 51b having a straight portion EG which, if produced, would cut the zero fuel axis at approximately the same point H as would be cut by a straight portion QR of the steady running line 52b, if the straight portion QR were produced.

In FIGURE 3a, the accleration line 51b is shown as passing through the point $K_1$ which corresponds to a high $T_1$. At a high $T_1$, fuel flow will therefore continue to be reduced along the line $K_1M_1L_1$. At a low $T_1$, however, fuel flow will now be reduced along a line $K_2'$, $M_2'$, $L_2$. The engine will therefore reach steady running conditions at $M_2'$ which is slightly higher speed than $M_2$.

It will be appreciated that the relative disposition of the parts EG and RQ of the lines 51b, 52b is such that the percentage reduction in fuel flow between $K_2'$ and $M_2'$ will be substantially the same as between $K_1$ and $M_1$. The size of the slot 26 will therefore be reduced to substantially the same extent, and the final controlled speed will be substantially the same, at all inlet temperatures.

In FIGURE 4 is shown a more detailed embodiment of the invention in which some parts previously shown have the same reference numerals. High pressure fuel from the pump enters the first control unit 25 through pipe 24. Mounted on bearings 60 in control unit 25 is a rotatable sleeve 61 having a toothed flange 62 and driven through gear wheel 63 carried on a shaft 64. The toothed flange 62 has a cylindrical extension 65 which pivotally supports governor weights 66 having operating arms 67.

The arms 67 contact a flange 68 on an axially-slidable sleeve 69 which is coaxial with sleeve 61. The governor weights 66 correspond to governor weights 34 shown in FIGURE 2.

The adjacent ends of sleeves 61 and 69 form edges of an annular slot 70, corresponding to rectangular slot 26 in FIGURE 2. The left-hand edge (as seen in FIGURE 4) of slot 70 is fixed but the right-hand edge of slot 70 is movable by governor weights 66 to close the slot 70 against pressure of a spring 71 as a required speed is reached.

The movable sleeve 69 has an end flange 72 which co-operates with stops 73 and 74 to define the limits of the width of slot 70.

The normal throttle control of the engine is exercised through a lever 108 acting through a mechanical connection, shown diagrammatically at 109, to turn a shaft carrying a pinion 75a. The pinion 75a controls the position of a rack 75 on a flanged member 75b which controls the spring 71.

Axially slidable in sleeve 61 is a piston 76 having a rod 77 to which is attached a cylindrical sleeve 78. In the wall of sleeve 78 are a number of triangular slots 79 corresponding to triangular slot 27 of FIGURE 2. A coil spring 80 is connected between sleeve 78 and a variable abutment 81 and will prevent rotation of sleeve 78 with sleeve 61.

The piston 76 is movable by pressure of fuel flowing through pipe 24 and apertures 82 in sleeve 61. The pressure exerted on piston 76, to move the sleeve 78 and therefore the triangular slot 79 against the pressure of spring 80 will depend on the position of a valve 82a carried by pivoted arm 83 movable by a bellows 84 (corresponding to bellows 27a in FIGURE 2).

The bellows 84 is subject to a pressure within a chamber 85 which is in proportion to the ratio of the pressure $P_2$, $P_1$. This pressure is produced by applying $P_2$ to the chamber 85 through a pipe 86 and restrictor 87 and exhausting the chamber 85 to $P_1$ through restrictor 88 and pipe 89.

The triangular slots 79 are therefore moved relatively to rectangular slot 70 in proportion to the said compressor ratio. Also the width of the annular slot 70 is controlled, within the limits set by the stops, in accordance with engine speed. Consequently the area of the orifice formed by triangular slot 79 and annular slot 70 is dependent on engine rotational speed and, independently, on the compressor ratio.

Fuel entering the unit at pipe 24 will therefore flow into the interior of sleeve 61, out into chamber 90, via a port 82b controlled by the valve 82a, and then through a passage 91 into a chamber 92 within sleeve 61. The fuel will then enter the interior of sleeve 78 and will flow through the orifice formed by triangular slots 79 and annular slot 70 into chamber 93. Metered fuel will flow from chamber 93 into pipe 37 and thence into the second control unit 38.

Fuel is also supplied to control unit 38 through pipe 42, the pressure of the fuel in the pipe 42 being pump delivery pressure less the pressure drop occurring across the port 82b.

Thus the pressure drop established across the orifice formed by triangular slot 79 and annular slot 70 is applied across a piston 94 slidable in a sleeve 94'. The piston 94 corresponds to piston 39 in FIGURE 1.

The unit 38 includes a drive pinion 95 driven by the engine and fast with a shaft 96 journalled in the control unit 38, the shaft 96 being in turn fast with a drum-like housing 97 carrying a toothed flange 98 which drives gear wheel 63.

The housing 97 is journalled on a bearing 99, and pivotally supports governor weights 100, 101 (corresponding to governor 48 in FIGURE 1) having arms 102, 103 which bear against a cap 104 enclosing a coil spring 105 in a housing 105a.

Normally the arms 102 and 103 urge the cap 104 to a position in which the housing 105a is closed and the spring compressed. At low speeds the cap 104 moves to the right (as seen in FIGURE 4) until it abuts stop 104a leaving piston 94 under control of spring 105.

Weights 100, 101 comprise bores 100a, 101a which are filled with material of such density that the mean density of the weights 100, 101 is approximately twice the mean density of the fuel.

The piston 94 controls orifices 107 and 106 in the sleeve 94' (corresponding to orifices 44 and 46 in FIGURE 1) through which fuel can flow respectively to the main burner (45 in FIGURE 1) and the pilot burner (47 in FIGURE 1).

The piston 94 is therefore responsive to the pressure difference across the orifice formed by the triangular slot 79 and annular slot 70, and is also moved by arms 102 and 103 in response to engine speed.

The fuel pressure at orifice 107 is also applied through pipe 23 to the face 21 of piston 19 as described with reference to FIGURE 1.

It will be noted that relative rotation will occur between sleeve 61 and the assembly comprising piston 76 and sleeve 78. Also relative rotation will occur between piston 94 and the sleeve 94' containing ports 106 and 107. Thus rotation occurs between relative parts of all sliding metering devices. In such instances both parts should be made of harder material than any dirt likely to be encountered, to minimize risk of sticking.

Also the full fuel flow is employed to move the metering devices, thus ensuring a rapid response.

The operation of the system described above is as follows:

Fuel from the pump outlet 16 (FIGURE 1) enters the unit 25 through pipe 24 (FIGURES 1 and 4) and flows through aperture 82 into the sleeve 61. The high pressure fuel will move piston 76 and therefore move the triangular slot 79 in accordance with the pressure drop across valve 82a which is controlled by air pressure in dependence on the compressor ratio $P_2/P_1$. The fuel, at high pressure, then flows through passage 91 into sleeve 78 and through the triangular slots 79. The triangular slots 79 register with the annular slots 70, which tend to close under the action of governor weights 66 when a required speed is approached. The maximum and minimum widths of slots 70 are set by stops 74 and 73 respectively.

When the engine is accelerated, the setting of the pinion 75a, by the pilot's operation of the lever 108, and hence the compression of the spring 71 is such that the slot 70 has its maximum width, and this gives the required acceleration control. During deceleration the slot 70 has its minimum width, which prevents flame-out due to undershooting. The minimum width of the slot can also be chosen to make the idling speed of the engine increase in flight.

Having passed through the slot 70, the high presure fuel flows through pipe 37 into unit 38, and the pressure of the metered fuel is exerted at one side of piston 94. To the other side of piston 94 is applied the pressure in the pipe 42, i.e. the fuel pump output fuel pressure less the pressure drop across the port 82b. The piston 94 is movable by governor weights 100 to establish a pressure drop proportional to the square of engine speed across the metering orifice formed by the combination of triangular slot 79 and annular slot 70. The governor weights 100 and 101 act in a direction, as speed increases, to open the ports 106, 107 in the sleeve surrounding piston 94. If fuel flow and pressure drop are excessive, ports 107 will tend to close.

As the embodiment of the invention shown in FIGURE 4 includes a variable stroke pump it is necessary to apply the pressure of the fuel supply to the main burner (through orifice 107) on one side 21 of piston 19 which is the pump servo piston controlling pump output. On the other side 22 of piston 19 is applied pump delivery pressure, and on the side 21 of piston 19 there is a strong spring 20a and fuel burner pressure. The pump delivery pressure is applied to piston 19 in a direction which tends to reduce the output of the pump. When the ports 107 tend to be closed by piston 94, pump pressure will rise and the balance of piston 19 will be upset. Spring 20a will therefore be compressed and pump stroke, and therefore output, will be reduced. If the main burner port orifices 107 are closed completely, the full flow from the pump will be available to reduce the pump output. This obviously gives a much more rapid response than is possible with any servo system acting on a small flow of fuel or other fluid.

Referring now to the embodiment of the invention shown in FIGURES 5 and 6, a fuel tank 210 contains a booster pump 211 which supplies fuel at a small positive pressure via a conduit 212 to the main fuel pump 213 of the positive displacement type. A bypass 213a containing spring-loaded relief valve 213b is provided around the pump. From the pump 213 the fuel is conveyed by conduit 214 to the control unit which is indicated generally at 215.

Within the control unit there is provided a chamber 216 filled with fuel at pump outlet pressure. A cylindrical member 217 (see also FIGURE 6) having an internal blanking wall 217a and terminating in a sharp edge 217b is mounted in a side wall of the chamber and extends thereinto and a sleeve 218 is mounted on the cylindrical member 217 in a manner to be free for rotation and axial sliding movement thereon. The sleeve 218 contains four triangular apertures 218a and carries a toothed gear wheel 218b. Axially aligned with member 218 is a further sleeve member 219 which is mounted in a bore 220 in an internal wall 221 to be free for axial and rotational movement therein and has a closed end 219a. The sleeve member 219 also carries a toothed gear wheel 219b. Slidably mounted within the cylindrical sleeve member 219 is an open-ended cylinder 222 terminating at its left-hand end in a sharp edge 222a; edges 217b and 222a thus form between them an annular gap with which cooperate the triangular apertures to produce four part annular orifices 223.

The length of each orifice, and thus its area, is controlled in accordance with the compressor ration $P_2/P_1$, in the following manner. Toothed gear wheel 218b meshes with a toothed gear wheel 224b carried by an actuating rod 224 secured to bellows 226 by means of a ball race 226a in a manner permitting rotational movement relative thereto whilst inhibiting relative axial movement. Bellows 226 is situated in chamber 227 which is connected by conduits 231 and 232 to the inlet and outlet ends respectively of the compressor 230 of the gas turbine engine with which the fuel system is associated. The conduits contain restrictors 231a and 232a and the pressure in the chamber 227 is thus a function of the compressor ratio. Axial movement of the rod 224 in response to variations of air pressure in the chamber 227 acting on the bellows is transmitted to the sleeve 218 by means of toothed wheel 218b being received between check plates 224a mounted on toothed wheel 224b.

The width of each part-annular orifice 223, and thus its area, is varied (between limits set by stops, not shown) in accordance with the square of rotational speed by axial movement of cylinder 222 under control of a lever arm 225 mounted on spindle 225a and having a forked end 225b co-operating with pins 222b carried by sleeve 222. The position of the lever arm 225 is controlled by a speed governor to be described later.

Fuel under pump pressure is admitted into the open-ended cylindrical member 222 through the part annular orifices 223 and then flows to the pilot and main burners 228b and 229b via conduits 228a and 229a respectively which are connected to annular channels 228 and 229 in the cylindrical surface 220 in wall 221 which receives the member 219.

Part annular sharp edged orifices 219c cooperate with the annular channels 228 and 229 such that during normal running channel 228 is unrestricted and the right-hand edges (as seen in FIGURE 5) of the orifices 219c throttle the flow to the main burners from channel 229.

At the lower end of the unit two speed governors 234 and 235 are mounted on and driven by shaft 236 which at its left-hand end (as seen in FIGURE 5) is received in a ball race 237 mounted in a recess in the wall 216a of chamber 216 and, at its right-hand end, is mounted in a plain bearing 238. The shaft 236 carries a toothed gear wheel 236a meshing with toothed gear wheel 239a mounted on a splined shaft 239 driven from the engine. The governors each comprise a cylindrical cup (234a, 235a) mounted on shaft 236 and mounted therein on pivots (234b, 235b) a pair of flyweights (234c, 235c). The inner ends of the flyweights are forked and those of governor 234 act on the inner race of a ball bearing 240 to impart axial movement to a sleeve 241 carrying a pin 241a engaging in the forked end of the lower part of lever arm 225 to impart axial movement of sleeve 241 to cylinder 222. The sleeve 241 is of stepped form and the shaft 236 has an enlarged portion 236b so that a chamber 242 is formed therebetween in which fuel is trapped to produce a viscous damper which counteracts any tendency to high frequency hunting of the governor 234. The spring load for this governor is produced by a tension spring 243 provided between the pilot's control lever 244 and a lever 245 mounted on the spindle 225a.

The governor 235 functions to produce a pressure drop across the part annular orifices 223 in accordance with the square of rotational speed. The forked inner ends of flyweights 235c bear on the outer race of ball bearing 246, the inner race of which is secured on a sleeve 247 free to slide axially on shaft 236 but prevented from rotating by having pin 247a received in the forked end of lever arm 248b. Lever arm 248a and lever arm 248b are pivoted at 249 and between the other end of arm 248a and one end of arm 248b is provided a compression spring 250. The other end of lever arm 248a bears against collar 251a on member 251 secured to the closed end of cylinder 219. As the left-hand face (as seen in FIGURE 5) of the end wall 219a of cylinder 219 is subjected to the fuel pressure downstream of the part annular orifices 223, and the right-hand face is subjected to the fuel pressure upstream of these orifices, a force directly proportional to the pressure drop across the orifices is applied to the member 219. This force is arranged to oppose the controlling force produced by the governor flyweights 235c and is maintained equal thereto by movement of the member 219 varying the restriction afforded to flow from the annular channel 229.

When operating under these conditions the force from the flyweights 235c is prevented from compressing the spring 250 by stops 248c, 248d respectively on the lever arms 248a and 248b abutting, and levers 248a and 248b moving as one. At low speeds it may be desired to increase the fuel flow above the amount given by this system. This may be achieved by spring 250. If the speed is so low that the load from flyweights 235c is less than the spring load, then the flyweights are forced back on to stop 235d and the spring controls the pressure drop across orifices 223 to a substantially constant minimum value. The spring 250 is not essential and if it is omitted the levers 248a and 248b are provided as one piece and the flyweight stops 235d are not required.

The flyweights 235c may be of material of a density about twice the density of the fuel in order to compensate the fuel flow for variations in fuel density as in British Patent No. 651,423 (Rolls-Royce). Governor weights 234c, however, should be as dense as possible.

The overall action of the control unit of FIGURES 5 and 6 is as follows:

During acceleration, the sharp-edged rings 217b and 222a are at their maximum distance apart and the rest of the system works as an acceleration control and as the required speed is approached the edge 222a approaches 217b which reduces the fuel flow and stabilizes the speed.

To prevent sticking of any parts subjected to relative axial sliding movement it is also arranged that relative rotational movement should occur between such parts. To achieve this, toothed gear wheels 218b and 219b mesh with the splined shaft 239 and thus member 218 rotates relatively to member 217 and cylinder 222 and member 219 rotates relatively to wall 221 and to cylinder 222. Due to engagement of toothed gear wheels 218b and 224a, rod 224 is rotated in the plain bearings 252 and 253 in which it is supported.

Rod 224 also has a central bore 224c which is open to a chamber 254 at its left-hand end (as seen in FIGURE 5) and communicates via drillings 224d with chamber 227 so that air pressure loads on the rod are balanced.

The member 219 may also act as a shut-off cock for the pilot fuel supply, the channel 228 being completely blanked off by member 219 being moved to the left by curved finger 257 operated by a shut-off lever (not shown).

Alternatively, the channel 228 and conduit 228a can be omitted, the pilot burner being supplied from conduit 255 leading from the interior of cylinder 217, a hole 217c being provided in the blanking wall 217a to communicate with the downstream side of the orifice 223. In this case separate shut-off cocks such as 256a, 256b would be provided in the conduits 255 and 229a respectively.

We claim:

1. A gas turbine engine fuel system for controlling the supply of pressurized fuel from a source thereof to the main burners of a gas turbine engine comprising means providing a metering orifice, a duct for supplying pressurized fuel from said source to said metering orifice, a first means responsive to engine rotational speed mechanically connected to the means providing the metering orifice for reducing the size of the metering orifice when a predetermined engine rotational speed is reached, means mechanically connected to the means providing the metering orifice for increasing the size of the metering orifice in functional relationship with increase in the ratio of the outlet and intake pressures of a compressor of the engine, a conduit for conveying fuel from the downstream side of said metering orifice to said main burners, a throttle valve for controlling the fuel flow through said conduit, means for employing the fuel pressure immediately upstream of said metering orifice to urge said throttle valve in a valve closing direction, means for employing the fuel pressure immediately downstream of said metering orifice to urge said throttle valve in a valve opening direction, and a second means continuously responsive to engine rotational speed for urging said throttle valve in the valve opening direction with a pressure which increases with increasing engine rotational speed.

2. A gas turbine engine fuel system for controlling the supply of pressurized fuel from a source thereof to main and pilot burners of a gas turbine engine comprising means providing a metering orifice, a duct for supplying pressurized fuel from said source to said metering orifice, a first means responsive to engine rotational speed mechanically connected to the means providing the metering orifice for reducing the size of the metering orifice when a predetermined engine rotational speed is reached, means mechanically connected to the means providing the metering orifice for increasing the size of the metering orifice in functional relationship with increase in the ratio of the outlet and intake pressures of a compressor of the engine, first and second conduits for conveying fuel from the downstream side of said metering orifice respectively to said main burners and said pilot burners, a throttle valve for controlling fuel flow through said first conduit, means for employing the fuel pressure immediately upstream of said metering orifice to urge said throttle valve in a valve closing direction, means for employing the fuel pressure immediately downstream of said metering orifice to urge said throttle valve in a valve opening direction, and a second means continuously responsive to engine rotational speed for urging said throttle valve in the valve opening direction with a pressure which increases with increasing engine rotational speed, the full flow of fuel from the source to the burners passing through said duct, said metering orifice, said conducts and said throttle valve.

3. A gas turbine engine fuel system for controlling the supply of pressurized fuel from a source thereof to main and pilot burners of a gas turbine engine comprising a pair of apertured sleeves mounted the one within the other for relative axial movement, means providing opposite pressure faces on one of said sleeves, the apertures in said sleeves cooperating with each other to constitute a metering orifice, a duct for supplying pressurized fuel from said source to said metering orifice, means providing a variable restriction in said duct, means for applying the fuel pressures prevailing on opposite sides of said restriction to said opposite pressure faces of said one of said sleeves, a first means mechanically connected to one of said sleeves and responsive to engine rotational speed for reducing the size of the metering orifice when a predetermined engine rotational speed is reached, means responsive to the ratio of outlet and intake pressures of a compressor of the engine for effecting variation of the size of said restriction, to thereby increase the size of the metering orifice, with increase in the ratio of the outlet and intake pressures, said pressure responsive means being mechanically connected to the other of said sleeves, first and second conduits for conveying fuel from the downstream side of said metering orifice respectively to said main and pilot burners, a throttle valve for controlling fuel flow through said first conduit, means for employing the fuel pressure immediately upstream of said metering orifice to urge said throttle valve in a valve closing direction, means for employing the fuel pressure immediately downstream of said metering orifice to urge said throttle valve in a valve opening direction, and a second means continuously responsive to engine rotational speed for urging said throttle valve in the valve opening direction with a pressure which increases with increasing engine rotational speed.

4. A gas turbine engine fuel system as claimed in claim 3 in which the variable restriction comprises a port in the wall of the outer sleeve and there is a valve mounted for movement towards and away from said port, said valve being connected to pressure responsive means, responsive to said outlet and intake pressures, for movement thereby.

5. A gas turbine engine fuel system for controlling the supply of pressurized fuel from a source thereof to the main burners of a gas turbine engine comprising means providing a metering orifice, a duct for supplying pressurized fuel from said source to said metering orifice, a first means responsive to engine rotational speed mechanically connected to the means providing the metering orifice for reducing the size of the metering orifice when a predetermined engine rotational speed is reached, means mechanically connected to the means providing the metering orifice for increasing the size of the metering orifice in functional relationship with increase in the ratio of the outlet and intake pressures of a compressor of the engine, a conduit for conveying fuel from the downstream side of said metering orifice to said main burners, a valve body and a throttle valve mounted therein for controlling fuel flow through said first conduit, means for effecting relative rotation between the valve body and throttle valve, means for employing the fuel pressure immediately upstream of said metering orifice to urge said throttle valve in a valve closing direction, means for employing the fuel pressure immediately downstream of said metering orifice to urge said throttle valve in a valve opening direction, and a second means continuously responsive to engine rotational speed for urging said throttle valve in the valve opening direction with a pressure which increases with increasing engine rotational speed.

6. A gas turbine engine fuel system for controlling the supply of pressurized fuel from a source thereof to a burner of a gas turbine engine comprising means providing a metering orifice, means for supplying pressurized fuel from said source to said burner via said metering orifice, speed responsive means mechanically connected to the means providing the metering orifice for varying the size of the metering orifice in accordance with engine rotational speed, a conduit opposite ends of which are adapted to be supplied with air at pressures functionally related to the pressures of the inlet and outlet ends of a compressor of the engine, a pair of spaced restrictions in said conduit, a pressure responsive means rigidly mechanically connected to the means providing the metering orifice arranged to vary the size of the metering orifice, means for applying to said pressure responsive means the pressure in the space between said restrictions, and means for throttling the fuel flow from the orifice to the burner in accordance with the pressure drop across the metering orifice.

7. A gas turbine engine fuel system as claimed in claim 6 in which the pressure responsive means comprises a bellows mounted in a chamber, said chamber communicating with the space between the restrictions.

8. A gas turbine engine fuel system as claimed in claim 6 in which the means for throttling the fuel flow from the orifice to the burner is also controlled by means continuously responsive to engine rotational speed, said last mentioned means opposing the higher of the pressures across said orifice.

9. A gas turbine engine fuel system for controlling the supply of pressurized fuel from a source thereof to a burner of a gas turbine engine comprising means providing a metering orifice, means for supplying pressurized fuel from said source to said burner via said metering orifice, speed responsive means mechanically connected to the means providing the metering orifice to vary the size of the latter in accordance with engine rotational speed, adjustable stops engageable with the means providing the metering orifice, said stops controlling the extent to which the size of the metering orifice may be varied by the speed responsive means, a conduit opposite ends of which are adapted to be supplied with air at pressures functionally related to the pressures of the inlet and outlet ends of a compressor of the engine, a pair of spaced restrictions in said conduit, a pressure responsive means directly mechanically connected to the means providing the metering orifice and arranged to vary the size of the metering orifice, means for applying to said pressure responsive means the pressure in the space between said restrictions, and means for throttling the fuel flow from the orifice to the burner in accordance with the pressure drop across said metering orifice.

References Cited in the file of this patent

UNITED STATES PATENTS

| | | |
|---|---|---|
| 2,593,536 | Chamberlin et al. | Apr. 22, 1952 |
| 2,668,416 | Lee | Feb. 9, 1954 |
| 2,670,599 | Davies et al. | Mar. 2, 1954 |
| 2,714,803 | Abild | Aug. 9, 1955 |
| 2,763,126 | Halford et al. | Sept. 18, 1956 |
| 2,836,957 | Fox | June 3, 1958 |
| 2,856,754 | Torell | Oct. 21, 1958 |
| 2,858,700 | Rose | Nov. 4, 1958 |
| 2,861,420 | Lewis | Nov. 25, 1958 |
| 2,938,341 | Miller | May 31, 1960 |
| 2,950,596 | Haase et al. | Aug. 30, 1960 |

FOREIGN PATENTS

| | | |
|---|---|---|
| 211,974 | Australia | June 7, 1956 |
| 646,780 | Great Britain | Nov. 29, 1950 |